US006430777B1

(12) United States Patent
Lu

(10) Patent No.: US 6,430,777 B1
(45) Date of Patent: Aug. 13, 2002

(54) PIVOT DEVICE FOR A NOTEBOOK COMPUTER

(76) Inventor: Sheng-Nan Lu, No. 174, Chunying Street, Taipei Hsien (TW)

( * ) Notice: Subject to any disclaimer, the term of this patent is extended or adjusted under 35 U.S.C. 154(b) by 0 days.

(21) Appl. No.: 09/824,642

(22) Filed: Apr. 4, 2001

(51) Int. Cl.[7] .......................... E05C 17/64; E05D 11/08
(52) U.S. Cl. .......................... 16/340; 16/387; 361/681; 403/111; 403/120; 248/922
(58) Field of Search .......................... 16/340, 342, 337, 16/338, 387; 361/680, 681, 682, 683; 403/103, 111, 120, 119, 146; 248/923, 922, 919, 920

(56) References Cited

U.S. PATENT DOCUMENTS

| 5,269,047 A | * 12/1993 | Lu ................................ 16/340 |
| 5,473,794 A | * 12/1995 | Kobayashi .................... 16/319 |
| 5,772,351 A | * 6/1998 | Ching .......................... 16/337 |
| 5,913,351 A | * 6/1999 | Miura .......................... 16/340 |
| 6,154,925 A | * 12/2000 | Miura .......................... 16/338 |
| 6,163,928 A | * 12/2000 | Chung .......................... 16/337 |
| 6,171,011 B1 | * 1/2001 | Wu .............................. 16/337 |

FOREIGN PATENT DOCUMENTS

JP            99133      * 4/2001

* cited by examiner

*Primary Examiner*—Chuck Y. Mah
(74) *Attorney, Agent, or Firm*—Fei-Fei Chao; Venable, Baetjer, Howard & Civiletti

(57) ABSTRACT

A pivot device has a seat and a pivotal axle pivoted with the seat. The pivotal axle has a retaining shoulder, a retaining portion and a pivot portion respectively formed at two ends of the retaining shoulder, a threaded end formed at one end of the pivot portion, and multiple positioning holes defined in the retaining portion to receive screws for fastening the pivotal axle to screen. The seat comprises a flat portion defined with multiple retaining holes, a plate formed at a first edge of the flat portion, a hole defined in the plate, and a pivotal ring formed at a second edge being adjacent to the first edge. The threaded end and the pivot portion are inserted into the pivotal ring and the hole through multiple washers and elastic rings, and then a free end of the threaded end is fastened with a nut.

2 Claims, 4 Drawing Sheets

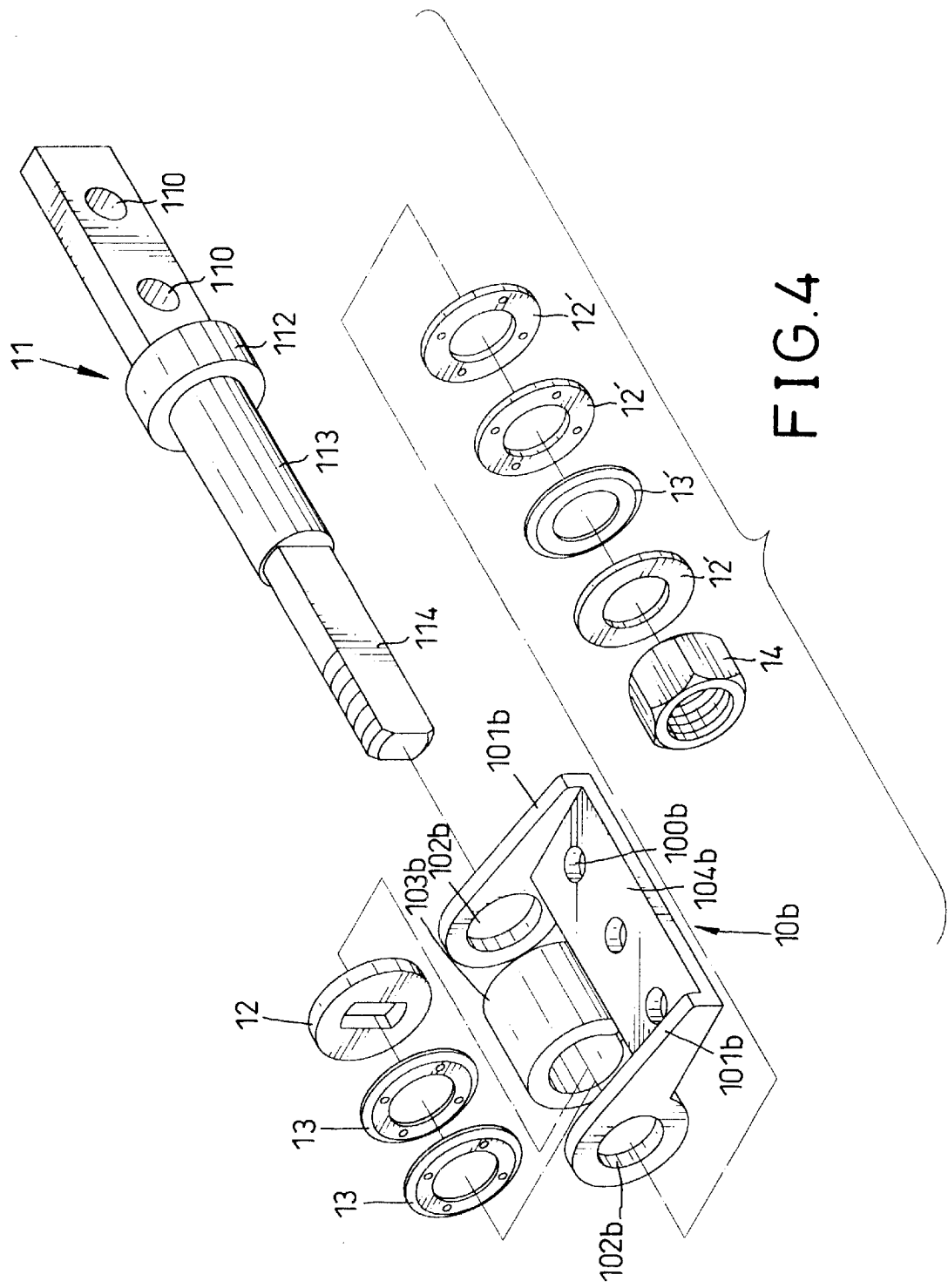

PIVOT DEVICE FOR A NOTEBOOK COMPUTER

BACKGROUND OF THE INVENTION

1. Field of the Invention

The present invention relates to a pivot device for a notebook computer, and more particularly to a pivot device that has a small volume, good pivoting and supporting effects between an LCD screen and a host of the notebook computer.

2. Description of Related Art

In recent years, the communication technology has made dynamic progress, especially in the internet communication field. Many businessmen, enterprises or students use the internet to gather new information, to communicate with other people by E-mail, or to spread advertisements etc. Generally, a personal computer (PC) is used as a medium for a communication of users. However, the PC usually has many peripheral devices, such as a host, a monitor (screen), a keyboard and a mouse, etc., wherein the volume of the host and monitor are comparatively large, such that the PC occupies a significant amount of space. In order to overcome the size inconvenience of the PC, manufacturers of the PC are gradually introducing notebook computers to replace the PC. The notebook computer has some advantages, such as low weight, small volume, and great portability, thus the notebook computer is gradually becoming a very popular device.

One of the research and development principles of the notebook computer considers how to minimize the volume of the notebook computer. For instance, it might directed to minimize the components or the keyboard size of the notebook computer. Conventionally, a pivot device set between an LCD screen and a host of the notebook computer is designed to have a quite large because it needs to provide enough strength of support and pivot force between the LCD screen and the host. This pivot size means that it is difficult to reduce the size of the notebook computer further. To overcome the shortcomings and minimize the volume of the pivot device, the present invention tends to provide a pivot device for a notebook computer to mitigate and obviate the aforementioned problems.

SUMMARY OF THE INVENTION

The main objective of the invention tends to provide a pivot device for a notebook computer, the pivot device having a small volume and providing good pivoting effect between an LCD screen and a host of the notebook computer.

Other objects, advantages and novel features of the invention will become more apparent from the following detailed description when taken in conjunction with the accompanying drawings.

BRIEF DESCRIPTION OF THE DRAWINGS

FIG. 4 is an exploded perspective view of a third embodiment of the pivot device in accordance with the present invention.

DETAILED DESCRIPTION OF THE PREFERRED EMBODIMENT

Figure 1:
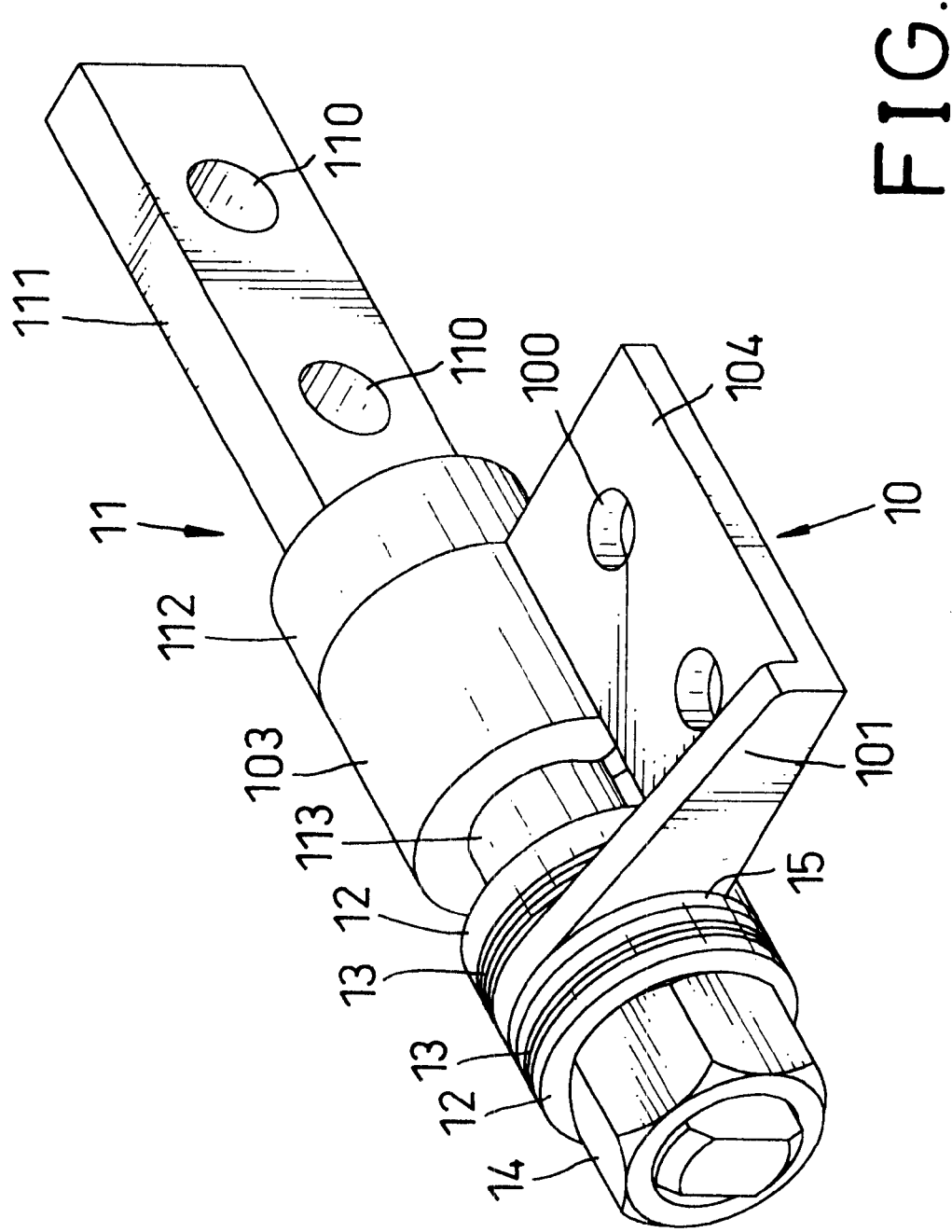
FIG. 1 is a perspective view of a first embodiment of a pivot device that is assembled in accordance with the present invention.
Figure 2:
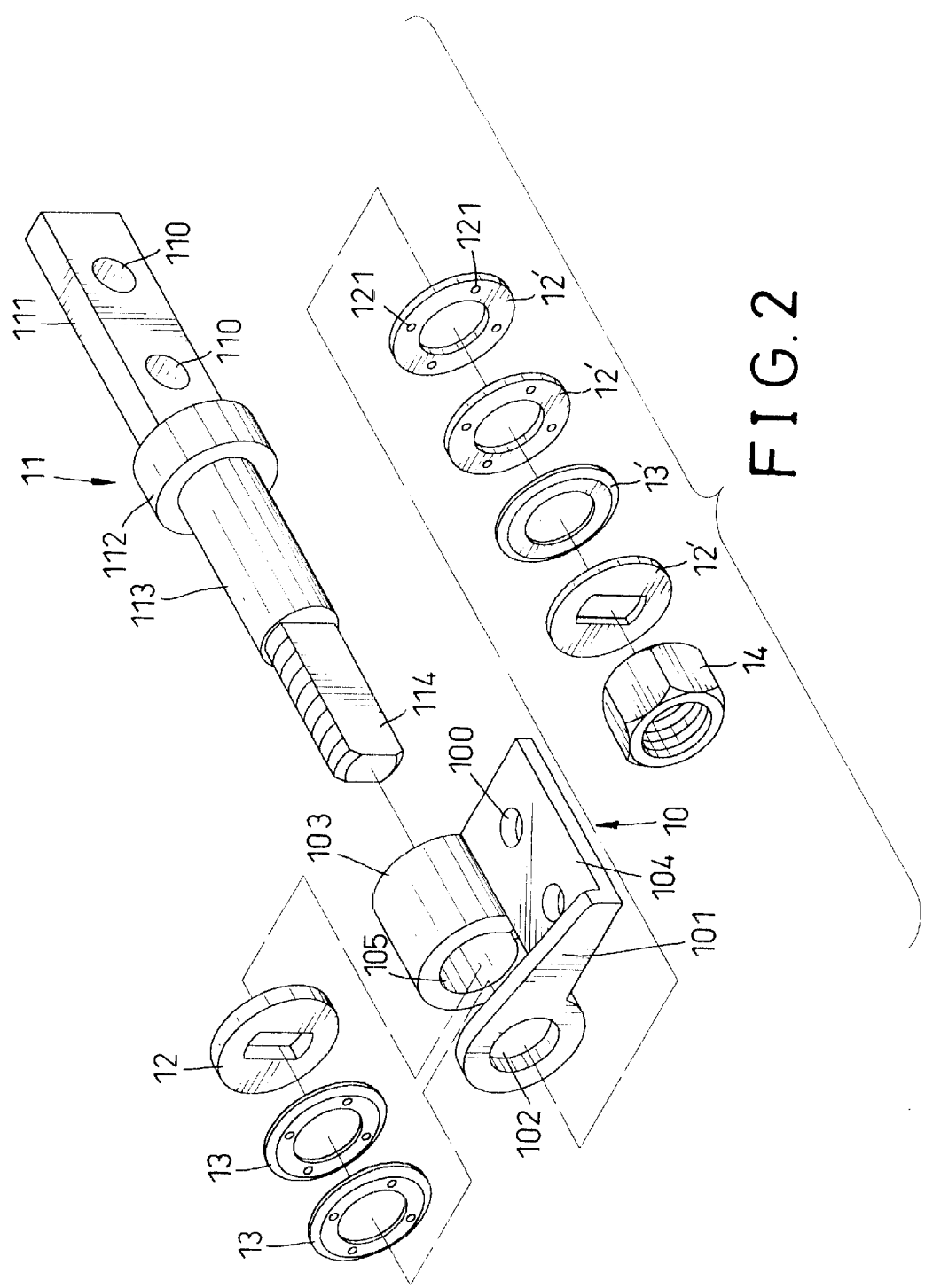
FIG. 2 is an exploded perspective view of the first embodiment of the pivot device in accordance with the present invention.

With regards to FIGS. 1 and 2, a first embodiment of a pivot device in accordance with the present invention comprises a seat (10) and a pivotal axle (11) pivotally connected with the seat (10). The pivotal axle (11) has a retaining shoulder (112) formed at a middle portion of the pivotal axle (11), a retaining portion (111) integrally formed at a first end of the retaining shoulder (112), and a pivotal portion (113) having a first end integrally formed at a second end of the retaining shoulder (110). A threaded end (114) is integrally formed at a second end of the pivotal portion (113). The retaining portion (111) is defined with at least two positioning holes (110), wherein the retaining portion (111) of the pivotal axle (10) is securely connected with an LCD screen of a notebook computer (not shown in drawings) by inserting screws into the positioning holes (110) and fastening with the LCD screen.

As shown in FIG. 2, in a first embodiment of the pivot device, the seat (10) comprises a flat portion (104) that is used to securely mounted on a host of the notebook computer (not shown in drawings), and a plate (101) perpendicularly and integrally formed at a first edge of the flat portion (104). The plate (101) is defined with a hole (102). A pivotal ring (103) is integrally formed at a second edge that is adjacent to the first edge of the flat portion (104). A cannular portion (105) of the pivotal ring (103) is aligned with the bole (102) of the plate (101), wherein the pivotal ring (103) does not contact with the plate (101), and a space is defined between the plate (101) and the pivotal ring (103). The flat portion (104) is further defined with at least two retaining holes (100) for receiving screws to fasten the seat (10) with the host of the notebook computer.

In assemblage of the pivot device, the threaded end (114) and the pivotal portion (113) are inserted into the cannular portion (105) of the pivotal ring (103) and the hole (102) of the plate (101). In order to reduce friction that generates from the pivotal operating, the threaded end (114) also extends through at least one of a first plurality of washers (12) and a first plurality of elastic rings (13), wherein the one of the first plurality of washers (12) and the first plurality of elastic rings (13) are set between a first side of the plate (101) and the pivotal ring (103). A free end of the threaded end (114) extends through the hole (101) of the plate (101), a second plurality of washers (12'), a second plurality of elastic rings (13'), and then the free end is fastened with a screw nut (14). Both the first plurality of the washers (12) and the second plurality of the washers (12') are able to be defined with a plurality of lubrication holes (121) to retain a lubricant therein.

Figure 3:
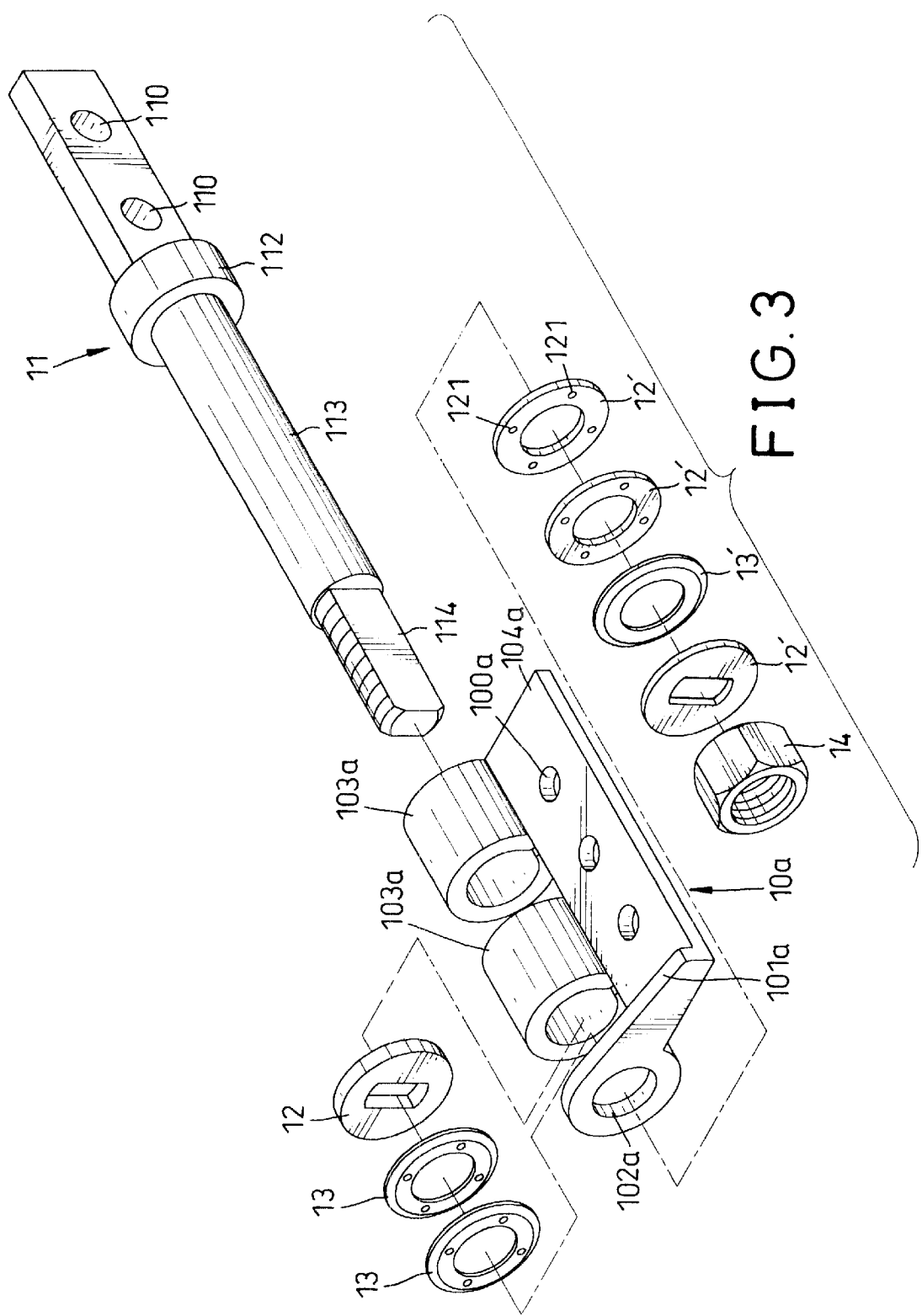
FIG. 3 is an exploded perspective view of a second embodiment of the pivot device in accordance with the present invention.

A second embodiment is shown in FIG. 3, wherein in addition to the seat (10a), the pivot device of the second embodiment is basically same as the pivot device of the first embodiment. The seat (10a) shown in FIG. 3 comprises a flat portion (104a), a plate (101a) perpendicularly and integrally formed at a first edge of the flat portion (104a), two pivotal rings (103a) integrally formed at a edge that is adjacent to the first edge of the flat portion (104a). The flat portion (104a) is further defined with a plurality of retaining holes (100a).

A third embodiment is shown in FIG. 4, wherein in addition to the seat (10b), the pivot device of the second embodiment is basically same as the pivot device of the first embodiment. The seat (10b) shown in FIG. 4 comprises a flat portion (104b), a pair of plates (101b) perpendicularly and integrally formed at two opposite edges of the flat portion (104b), and a pivotal ring (103b) integrally formed at an edge that is adjacent to the two opposite edges of the flat portion (104b). The flat portion (104b) is further defined with a plurality of retaining holes (100a).

Although the present invention has been explained in relation to its preferred embodiment, it is to be understood that many other possible modifications and variations can be made without departing from the spirit and scope of the invention as hereinafter claimed.

What is claimed is:

1. A pivot device for a notebook computer comprising:
   a pivotal axle with
      a retaining shoulder;
      a retaining portion integrally formed at a first end of the retaining shoulder, wherein a plurality of positioning holes are defined in the retaining portion for receiving screws whereby the retaining portion is fastened with an LCD screen;
      a pivot portion having a first end integrally formed at a second end of the retaining shoulder;
      a threaded end integrally formed at a second end of the pivot portion;
   a seat with
      a flat portion, wherein a plurality of retaining holes are defined in the flat portion for receiving screws whereby the flat portion is able to be secured with a host of the notebook computer;
      a plate perpendicularly formed on the flat portion and defining therethrough a hole to correspond to the pivot portion and the threaded end;
      at least one pivotal ring formed on the flat portion and defining a cannular potion in alignment with the hole to correspond to the pivot portion and the threaded end;
   at least one of multiple first washers provided between the at least one pivotal ring and a first side of the plate to correspond to the pivot portion and the threaded end;
   at least one of multiple second washers provided between a nut and a second side of the plate to correspond to the pivot portion and the threaded end, wherein a free end of the threaded end is fastened by the nut.

2. The pivot device for a notebook computer as claimed in claim 1, wherein a plurality of lubrication holes are defined in the at least one of multiple first washers and the at least one of multiple second washers to retain a lubricant therein.

* * * * *